(12) United States Patent
Bokov et al.

(10) Patent No.: US 11,297,314 B2
(45) Date of Patent: *Apr. 5, 2022

(54) ADAPTIVE FILTER INTRA PREDICTION MODES IN IMAGE/VIDEO COMPRESSION

(71) Applicant: GOOGLE LLC, Mountain View, CA (US)

(72) Inventors: Alexander Bokov, Mountian View, CA (US); Hui Su, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 5 days.

This patent is subject to a terminal disclaimer.

(21) Appl. No.: 16/999,109

(22) Filed: Aug. 21, 2020

(65) Prior Publication Data

US 2020/0382773 A1 Dec. 3, 2020

Related U.S. Application Data

(63) Continuation of application No. 16/287,969, filed on Feb. 27, 2019, now Pat. No. 10,778,972.

(51) Int. Cl.
*H04N 19/11* (2014.01)
*H04N 19/184* (2014.01)
*H04N 19/117* (2014.01)

(52) U.S. Cl.
CPC .......... *H04N 19/11* (2014.11); *H04N 19/117* (2014.11); *H04N 19/184* (2014.11)

(58) Field of Classification Search
CPC ..... H04N 19/11; H04N 19/117; H04N 19/184
See application file for complete search history.

(56) References Cited

U.S. PATENT DOCUMENTS 6,456,656 B1 9/2002 Adolph et al.
8,331,448 B2 12/2012 Oguz et al.
(Continued)

FOREIGN PATENT DOCUMENTS

WO 2017192995 A1 11/2017
WO 2018064948 A1 4/2018

OTHER PUBLICATIONS

Bankoski, et al., "Technical Overview of VP8, An Open Source Video Codec for the Web", Jul. 11, 2011, 6 pp.
(Continued)

*Primary Examiner* — Tsion B Owens
(74) *Attorney, Agent, or Firm* — Young Basile Hanlon & MacFarlane, P.C.

(57) ABSTRACT

A processor decodes, from a compressed bitstream, an adaptive intra-prediction mode of a set of adaptive filter modes, the adaptive intra-prediction mode indicating a number of filter coefficients and relative locations with respect to a to-be-predicted pixel of a sub-set of neighboring pixels of the to-be-predicted pixel; determines filter coefficients for generating a prediction block of the block; and generates, by recursive extrapolations that use the filter coefficients and the relative locations, the prediction block. The set of adaptive filter modes includes a first adaptive mode and a second adaptive mode. The first adaptive mode and the second adaptive mode indicate a same number of coefficients. The first adaptive mode indicates a first set of first relative locations of a first sub-set of neighboring pixels that is different from a second set of second relative locations of a second sub-set of neighboring pixels indicated by the second adaptive mode.

20 Claims, 11 Drawing Sheets

(56) References Cited

U.S. PATENT DOCUMENTS

| | | | |
|---|---|---|---|
| 8,761,254 | B2 | 6/2014 | Boon et al. |
| 9,008,175 | B2 | 4/2015 | Van Der Auwera et al. |
| 9,432,699 | B2 | 8/2016 | Lainema et al. |
| 9,451,254 | B2 | 9/2016 | Joshi et al. |
| 9,667,994 | B2 | 5/2017 | Joshi et al. |
| 9,736,478 | B2 | 8/2017 | Minezawa et al. |
| 9,736,494 | B2 | 8/2017 | Suzuki et al. |
| 9,973,757 | B2 * | 5/2018 | Puri ............... H04N 19/105 |
| 2018/0176601 | A1 * | 6/2018 | Jeong ............... H04N 19/172 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion of International Application No. PCT/US2019/059030 dated Feb. 10, 2020; 13 pages.

Vanam Rahul et al; "Improved lossless intra coding for next generation video coding"; Proceedings of SPIE ISSN 0277-786X vol. 10524; Sep. 27, 2016; 10 Pages.

* cited by examiner

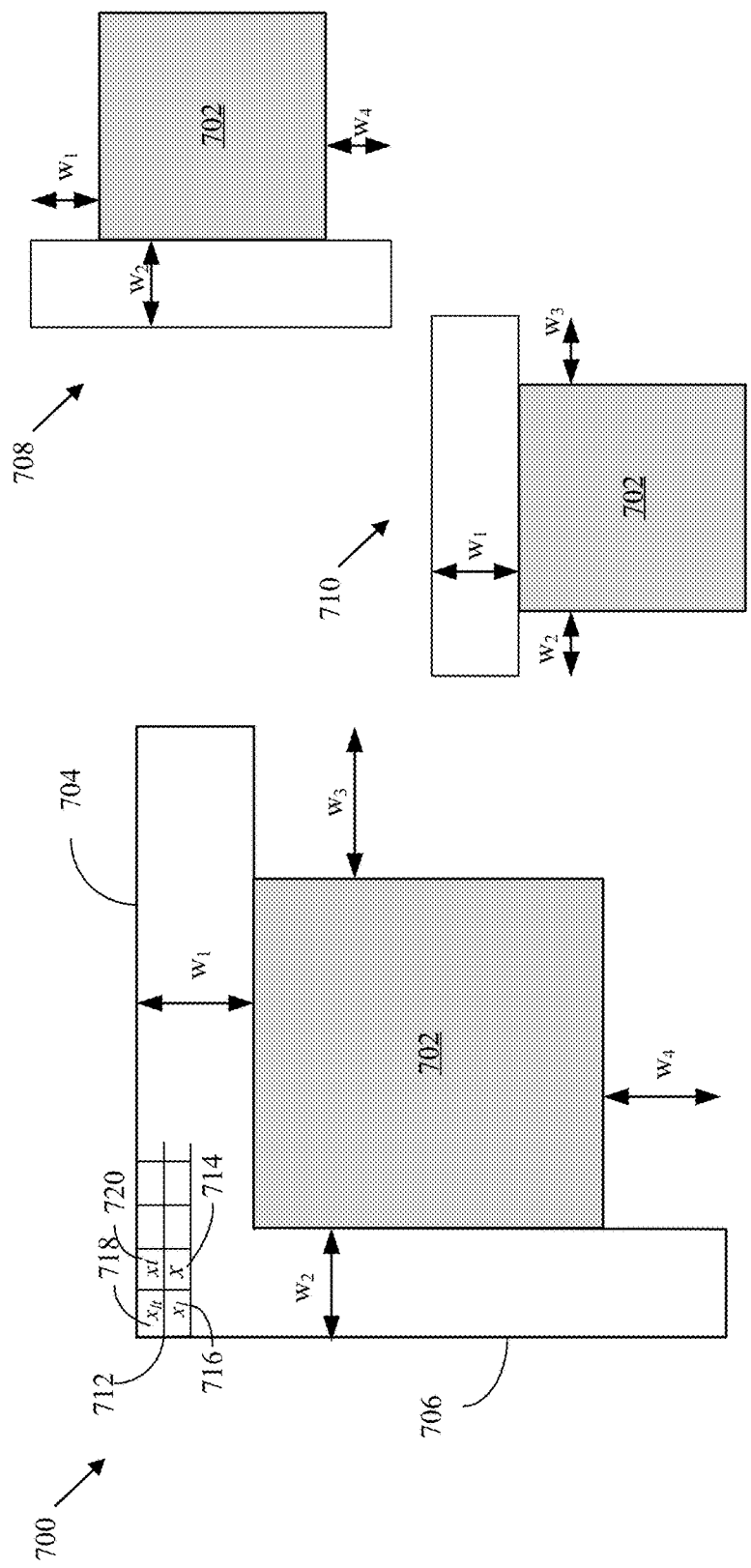
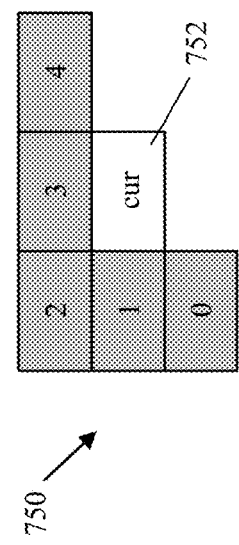
FIG. 7A
FIG. 7B

ADAPTIVE FILTER INTRA PREDICTION MODES IN IMAGE/VIDEO COMPRESSION

CROSS REFERENCE TO RELATED APPLICATION(S)

This application is a continuation of U.S. application patent Ser. No. 16/287,969, filed Feb. 27, 2019, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and the reference frames to reconstruct the frames or images.

SUMMARY

Disclosed herein are aspects, features, elements, and implementations for encoding and decoding blocks using intra-prediction edge filtering.

A first aspect is an apparatus for decoding a block of a frame using intra prediction. The apparatus includes a processor that decodes, from a compressed bitstream, an adaptive intra-prediction mode of a set of adaptive filter modes, the adaptive intra-prediction mode indicating a number of filter coefficients and relative locations with respect to a to-be-predicted pixel of a sub-set of neighboring pixels of the to-be-predicted pixel; determines filter coefficients for generating a prediction block of the block; and generates, by recursive extrapolations that use the filter coefficients and the relative locations, the prediction block of the block. The set of adaptive filter modes includes a first adaptive mode and a second adaptive mode. The first adaptive mode and the second adaptive mode indicate a same number of coefficients. The first adaptive mode indicates a first set of first relative locations of a first sub-set of neighboring pixels that is different from a second set of second relative locations of a second sub-set of neighboring pixels indicated by the second adaptive mode.

A second aspect is a method for decoding a block of a frame using intra prediction. The method includes decoding, from a compressed bitstream, an adaptive intra-prediction mode of a set of adaptive filter modes, the adaptive intra-prediction mode indicating a number of filter taps; determining filter coefficients for generating a prediction block; and generating, by recursive extrapolations that use the filter coefficients, the prediction block of the block. The set of adaptive filter modes includes a first adaptive mode and a second adaptive mode. The first adaptive mode and the second adaptive mode indicate a same number of taps.

A third aspect is a non-transitory computer-readable storage medium includes executable instructions that, when executed by a processor, facilitate performance of operations for decoding a block of a frame using intra prediction. The operations include operations to decode, from a compressed bitstream, an adaptive intra-prediction mode of a set of adaptive filter modes, the adaptive intra-prediction mode indicating a number of filter taps; determine filter coefficients for generating a prediction block of the block; and generate, by recursive extrapolations that use the filter coefficients, the prediction block of the block. The set of adaptive filter modes includes a first adaptive mode and a second adaptive mode. The first adaptive mode and the second adaptive mode indicate a same number of taps.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 7A is a diagram of a training region according to implementations of this disclosure.

FIG. 7B is a diagram of possible taps according to implementations of this disclosure.

FIG. 10A is a diagram of an intra prediction mode having a 90-degree prediction angle.

FIG. 10B is a diagram of an intra prediction mode having a 135-degree prediction angle.

DETAILED DESCRIPTION

Figure 1:
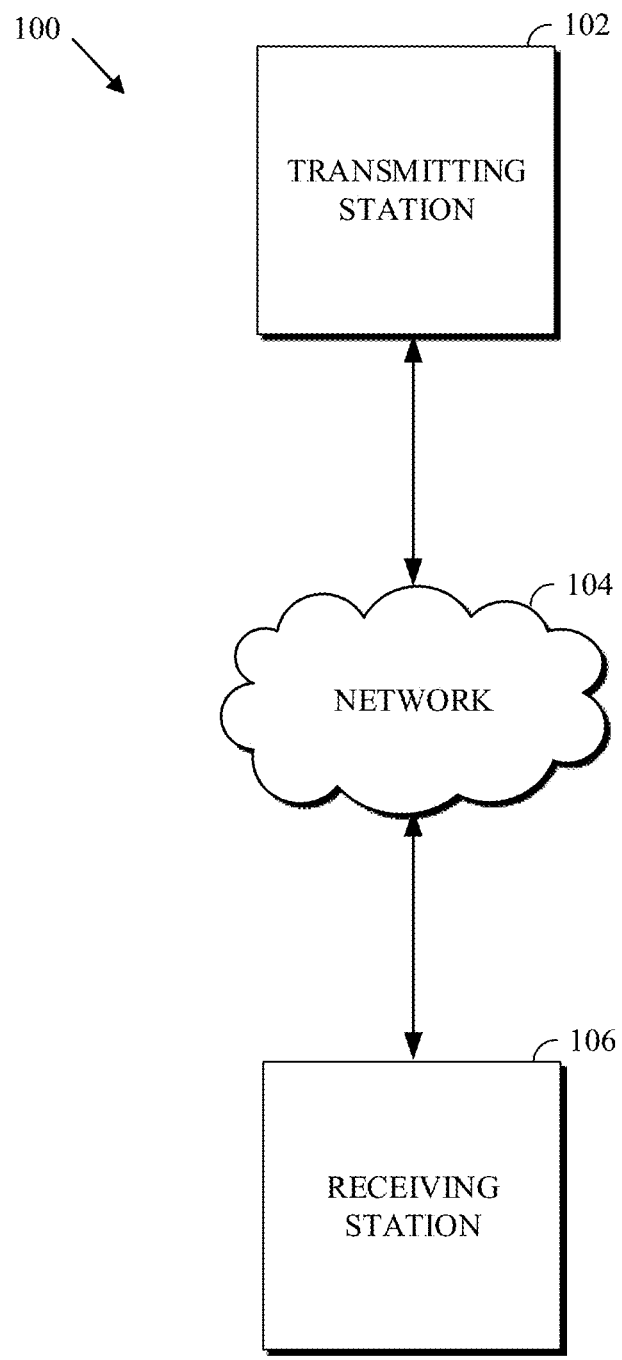
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using spatial similarities in the video stream to improve coding efficiency. For example, a current block of a video stream may be encoded based on identifying a difference (e.g., a residual) between previously coded pixel values, or between a combination of previously coded pixel values, and those in a current block being encoded.

Encoding using spatial similarities can be known as intra prediction. Intra prediction attempts to predict the pixel values of a current block of a frame of a video stream using pixels peripheral to the current block; that is, using pixels that are in the same frame as the current block but that are outside of the current block. Intra prediction can be performed along a direction of prediction, referred to herein as prediction angle, where each direction can correspond to an intra prediction mode. The intra prediction mode can be signalled by an encoder to a decoder.

Many different intra prediction modes can be supported (e.g., available). Some intra prediction modes use a single value for all pixels within the prediction block generated using at least one of the peripheral pixels. Others, which can be referred to as directional intra prediction modes, each can have a corresponding prediction angle. Intra prediction modes can include, for example, horizontal intra prediction mode, vertical intra prediction mode, and various other directional intra prediction modes. As such, the prediction angle can be any angle between 0 and 360 degrees. In some implementations, the prediction angle can be any angle between 0 and 270 degrees. Available prediction angles can also be a subset of all possible prediction angles. For example, a codec can have available prediction modes corresponding to 50-60 prediction angles of the 0 to 360 prediction angles.

In an example, the prediction angle can be encoded as a base angle and an offset. For example, the offset can be in the range of [-3,+3] degrees from the base angle. For example, the AV1 codec includes eight base directional intra prediction modes. As such, a total of 8*6=54 intra prediction angles can be available. The 54 intra prediction angles correspond to the eight base prediction angles and six offsets for each of the base prediction angles.

The various directional intra prediction modes can be used to propagate pixel values from previously coded blocks along an angular line (including horizontal, vertical, and directions offset from the horizontal and/or the vertical) to predict a block. For example, pixel values being propagated can include peripheral pixels above and/or to the left of the block in the same frame (e.g., when raster scan order is used in encoding).

The current block can be predicted by projecting reference pixels from peripheral pixels. For example, the peripheral pixels can include pixels to the left and above (i.e., top) boundaries of the current block, in a certain angle or direction that can be offset from the horizontal and the vertical lines. The reference pixels can be, for example, actual pixel values of the peripheral pixels or average pixel values (such as weighted average) of some of the peripheral pixels, which are propagated in angular directions to form the prediction block. The peripheral pixels can be combined in other ways to generate the reference pixels.

Figure 9:
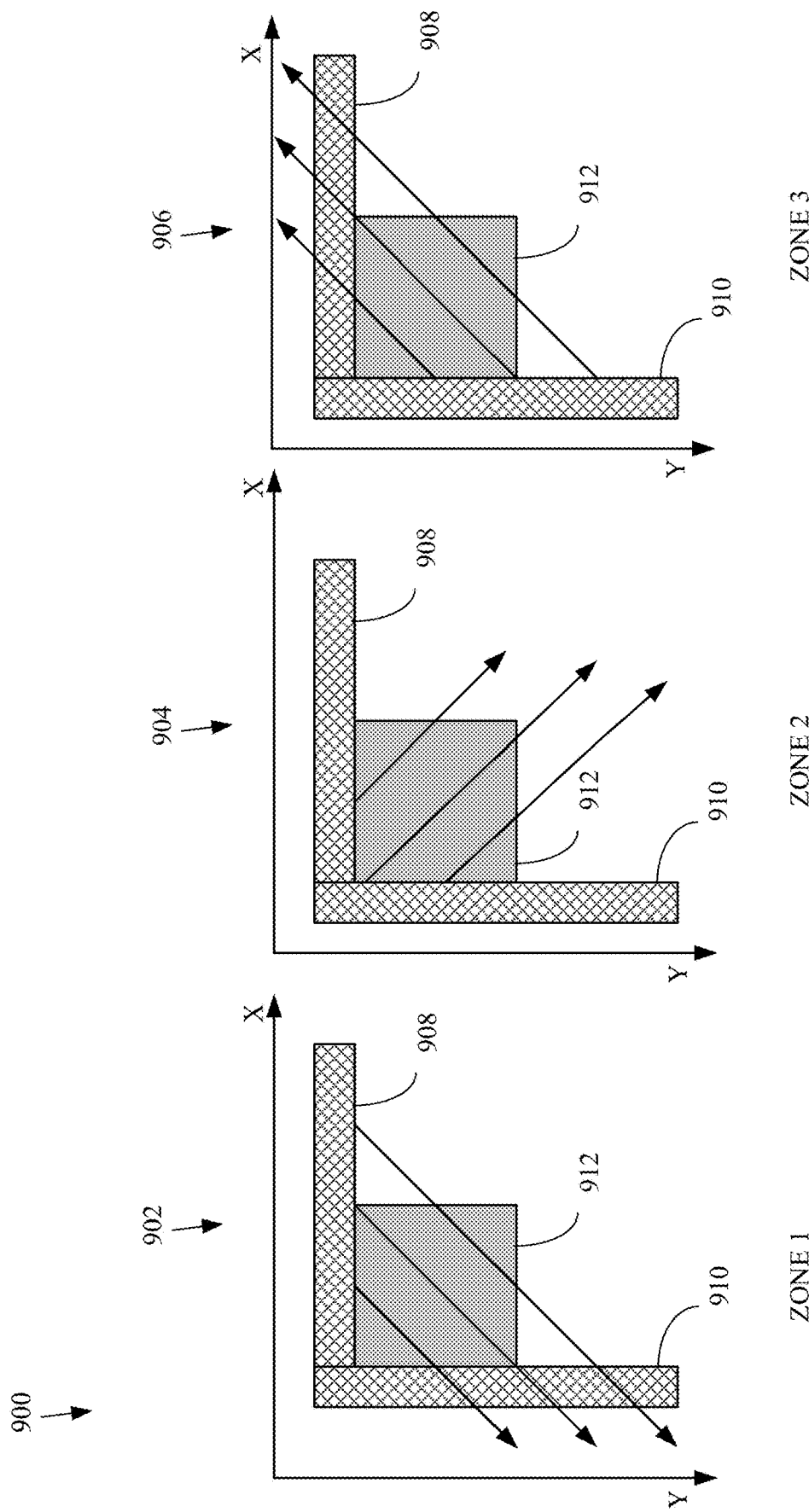
FIG. 9 is a diagram of directional intra prediction modes according to implementations of this disclosure.

FIG. 9 is a diagram 900 of directional prediction modes according to implementations of this disclosure. FIG. 9 illustrates three example directional prediction modes 902, 904, and 906 labeled Zone 1, Zone 2, and Zone 3, respectively. The illustrated directional prediction modes 902-906 can be used to generate a prediction block having dimensions conforming to a current block 912. Directional prediction mode 902 illustrates an intra prediction mode having a prediction angle between 0 and 90 degrees. Directional prediction mode 904 illustrates an intra prediction mode having a prediction angle between 90 and 180 degrees. Directional prediction mode 906 illustrates an intra prediction mode having a prediction angle between 180 and 270 degrees.

FIG. 9 also illustrates first pixels 908 in a row above the current block and second pixels 910 in a column to the left of the current block. The first pixels 908 and the second pixels 910 can be used to generate the prediction block. In some implementations, directional predictions in Zone 1 (i.e., intra prediction modes having prediction angles between 0 and 90) use the first pixels 908 but may not use the second pixels 910 to generate the prediction block; directional predictions in Zone 2 (i.e., intra prediction modes having prediction angles between 90 and 180) use the first pixels 908 and the second pixels 910 to generate the prediction block; and directional predictions in Zone 3 (i.e., intra prediction modes having prediction angles between 180 and 270) use the second pixels 910 but may not use the first pixels 908 to generate the prediction block.

Figures 10A, 10B:
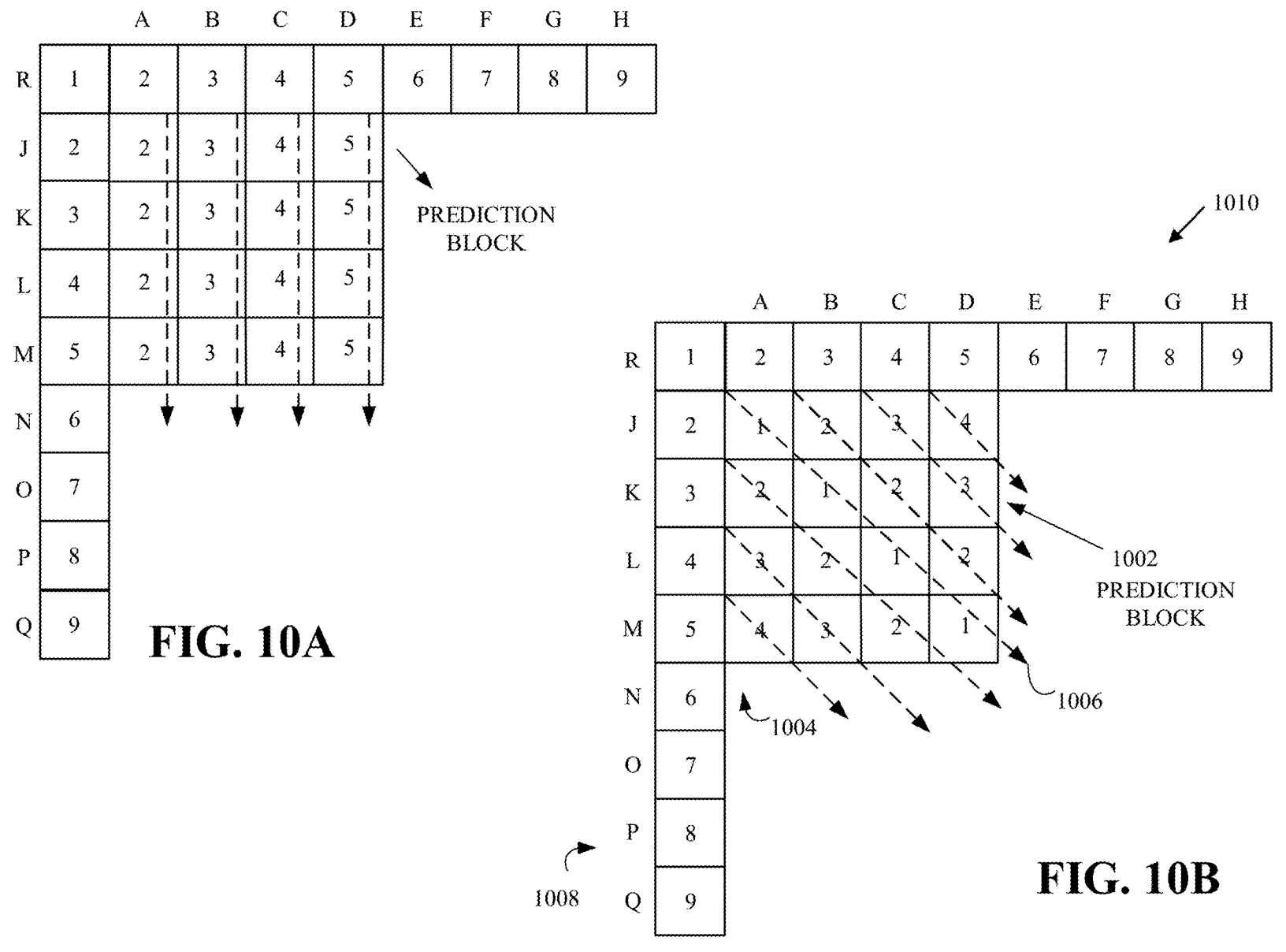

FIG. 10A is a diagram of an intra prediction mode having a 90-degree prediction angle. FIG. 10A illustrates generating a prediction block for a 4×4 block to be predicted (also called a current block) and corresponds to a directional prediction in Zone 2 (i.e., the directional prediction mode 904) of FIG. 9. The intra prediction mode of FIG. 10A propagates peripheral pixels A through D down the columns of the prediction block such that each pixel in a column has its value set equal to that of the adjacent peripheral pixel A through D in the direction of the arrows.

FIG. 10B is a diagram of an intra prediction mode having a 135-degree prediction angle. FIG. 10B illustrates generating a prediction block for a 4×4 current block and corresponds to a directional prediction in Zone 2 of FIG. 9. The intra prediction mode of FIG. 10B propagates peripheral pixel values along a 135-degree line (i.e., lines 1006) to the right and down to form the prediction block. The peripheral pixel values can include, for example, some of peripheral pixels 1008 (i.e., pixels A through R) from blocks adjacent to the 4×4 current block of a frame 1010, to form the prediction block 1002 for the current block. Although the 135-degree intra prediction mode in FIG. 10B is illustrated using the pixel values of the peripheral pixels 1008 to generate the prediction block 1002, for example, a linear combination (e.g., weighted average) of some (e.g., two, three, or more) of the peripheral pixels can be used to predict pixel values of the prediction block along lines extending through the block. For example, the pixel value 1004 to be propagated along line 1006 can be formed from a weighted average of pixel values K, L, and M.

As mentioned, intra prediction largely consists of copying boundary pixels (or linear combinations thereof) along certain directions, which may reflect a simplistic model for the underlying spatial correlations. As an alternative, an image signal can be viewed as a 2-D non-separable Markov model whose corresponding correlation model can better capture the nuanced directionality effects within blocks. As such, an improvement in intra prediction can include a set of prediction modes represented by three-tap extrapolation filters to implement intra prediction based on these models. Such a model is referred to herein as recursive prediction, or recursive extrapolation.

Figure 11:
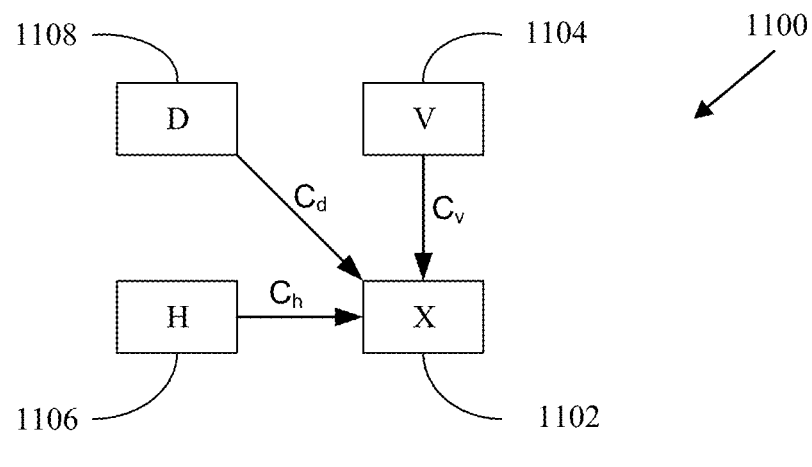
FIG. 11 is a diagram of an example of recursive extrapolation according to implementations of this disclosure.

FIG. 11 is a diagram of an example 1100 of recursive extrapolation according to implementations of this disclosure. Each pixel X of an image, such as a pixel 1102, can be considered according to a two-dimensional non-separable Markov model with zero-mean and unit variance and whose evolution recursion can be written as a function of a neighboring vertical pixel, V (such as a pixel 1104), a neighboring horizontal pixel, H (such as a pixel 1106), and a neighboring diagonal pixel, D (such as a pixel 1108), as given in formula (1)

$$X = c_v V + c_h H + c_d D + \epsilon \quad (1)$$

In formula (1), V, H, and D are, respectively, the specified vertical, horizontal, and diagonal neighbors of X, and $\epsilon$ denotes the innovation term.

The coefficients $c_v$, $c_h$, and $c_d$ effectively capture the correlation gradients in the two-dimensional space, or the 'directionality' of the image signal. Let $\hat{V}$, $\hat{H}$, and $\hat{D}$ denote the codec reconstruction of the pixels V, H, and D, respectively. In an encoder, reconstructed pixels are described below with respect to FIG. 4. In a decoder, reconstructed pixels are described with respect to FIG. 5. Briefly, reconstructed pixels are decoded pixel values of original (e.g., source) pixels. At least at high bit-rates, the reconstructions (i.e., the reconstructed pixels) closely approximate the original values. That is, the reconstructed pixels $\hat{V}$, $\hat{H}$, and $\hat{D}$ closely approximate the original pixel value V, H, and D, respectively. As such, the optimal predictor of X (i.e., the pixel 1102) can be closely approximated by $\hat{X} = c_v \hat{V} + c_h \hat{H} + c_d \hat{D}$.

In block-based video and image compression, and unlike the above differential pulse code modulation (DPCM) setting, which predicts each sample from available neighboring reconstructions, the codec must predict the entire block given a set of boundary pixels (i.e., pixels that are peripheral but outside the block). As illustrated with respect to a prediction block 1110, the prediction of an inner pixel does not have access to the reconstructions of its immediate neighbors. This difficulty can be circumvented by recursive extrapolation, in which prediction values of neighbors are fed into a 3-tap filter. In a recursive intra prediction mode, which may be referred to as filter_intra mode in some codecs, the predicted content of a block is defined as the outcome of a 3-tap filter and used as the input of the 3-tap filter for a future neighboring position, starting from the known boundary and recursively applied throughout to the far end of the block.

The prediction block 1110 illustrates peripheral, reconstructed pixels (i.e., the shaded pixels). The reconstructed pixels that are above the block 1110, which are known as the top neighboring pixels, are labeled $x_{0,1}$ to $x_{0,4}$. The reconstructed pixels that are to the left of the block 1110, which are known as the left neighboring pixels, are labeled $x_{1,0}$ to $x_{4,0}$. The pixel labeled $x_{0,0}$ is known as the top-left neighboring pixel.

The prediction pixel at the location labeled "1" in the prediction block 1110 can be derived, using formula (1) as $val(1) = c_v x_{0,1} + c_h x_{1,0} + c_d x_{0,0}$, where val(m) refers to the pixel value at a location labeled "m." The prediction pixel at the location labeled "2" in the prediction block 1110 can be derived, using formula (1) as $val(2) = c_v x_{0,2} + c_h val(1) + c_d x_{0,1}$. That is, the calculated value of the pixel at the location "1" is used in the calculation of the value at the location "2." As another example, the prediction value of the pixel at a location labeled "11" can be derived using the calculated values at locations "6," "7," and "10." As such, the calculated value of the pixel at location "11" is $val(11) = c_v val(7) + c_h val(10) + c_d val(6)$.

In a codec implementation, an N number of predefined 3-tap extrapolation filters can be available. That is, N sets of coefficients ($c_v$, $c_h$, $c_d$) can be available. Which one of the N sets to be used can be communicated from an encoder to a decoder, such as by encoding an indication of the set in a compressed bitstream. The predefined sets can be derived by offline training for each possible block size.

As mentioned, encoding an image block of a frame (e.g., a video frame, an image) using recursive extrapolation uses a 3-tap filter with predefined coefficients. As such, the coefficients are independent and have no relation to the image signal of which the image block is a part. Additionally, a filter that has more or less than 3 taps may be more appropriate (i.e., results in better compression) than the above-described 3-tap filter.

Implementations of this disclosure can derive, when coding a block of an image using recursive extrapolation, filter coefficients based on the signal of the image. That is, instead of using predefined coefficients (i.e., weights), the coefficients to be used in the extrapolation operations for deriving a prediction block of a current block, are calculated (e.g., determined) based on the image signal itself. Additionally, implementations according to this disclosure can determine (e.g., use, select, etc.) an extrapolation filter with a number of taps as appropriate for the block. For example, depending on the image signal, implementations of this disclosure can select either a 2-tap, a 3-tap, or a 4-tap filter for use in the extrapolation. Additionally, whereas the recursive extrapolation described above always uses the top, left, and diagonal neighboring pixels, implementations according to this disclosure can select from amongst a bottom-left, a left, a top-left, a top, and a top-right neighboring pixel in the extrapolation operation. To illustrate these neighboring pixels, and referring FIG. 11 again, the bottom-left, the left, the top-left, the top, and the top-right neighboring pixels of the pixel at location "11" are, respectively, the pixels at locations "14," "10," "6," "7," and "8."

Details are described herein after first describing an environment in which the multi-level compound prediction disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
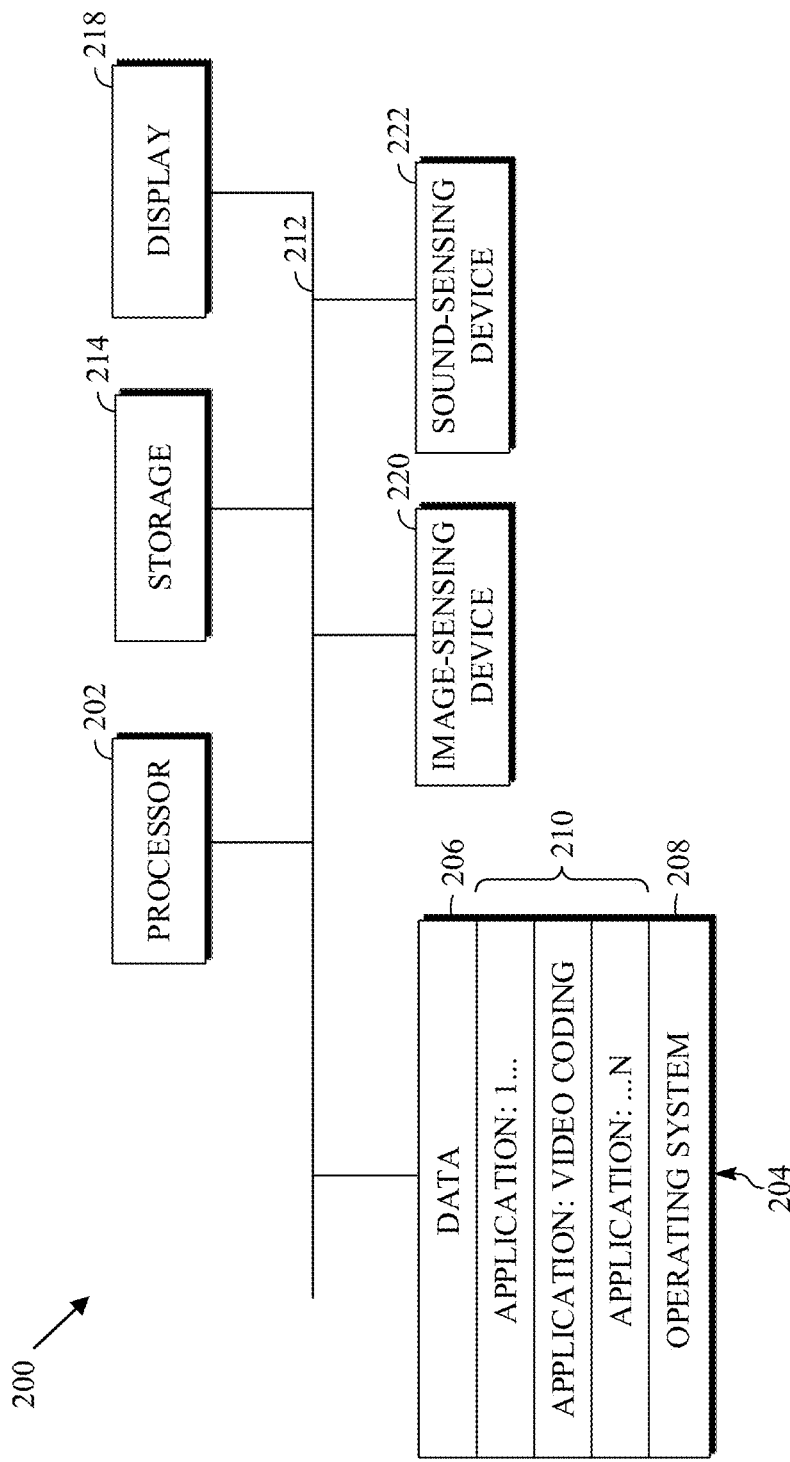
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
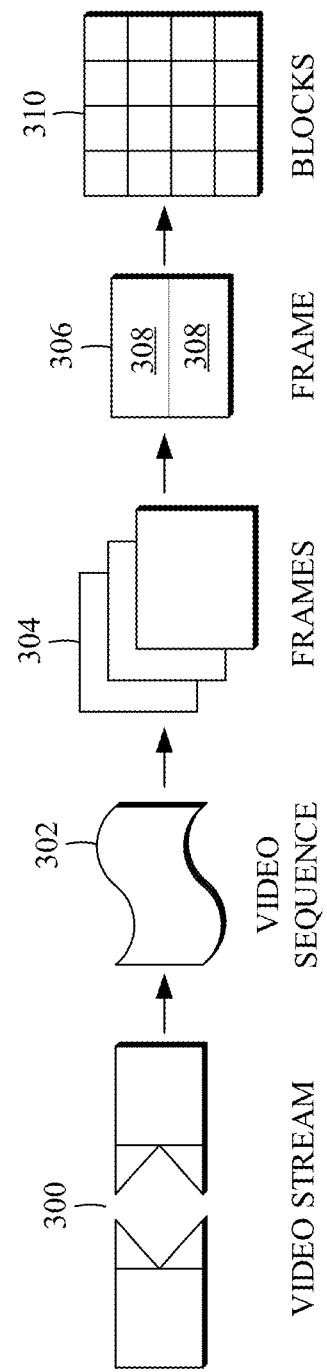
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
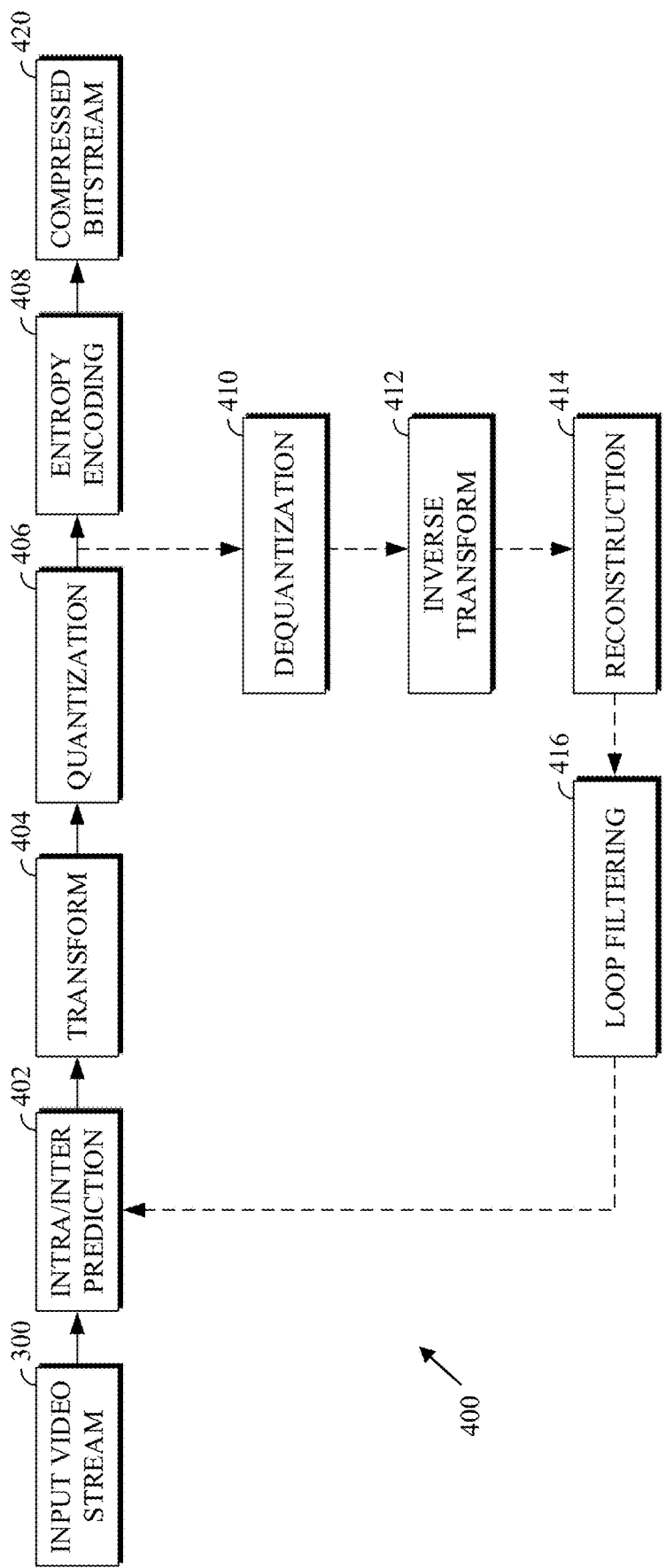
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
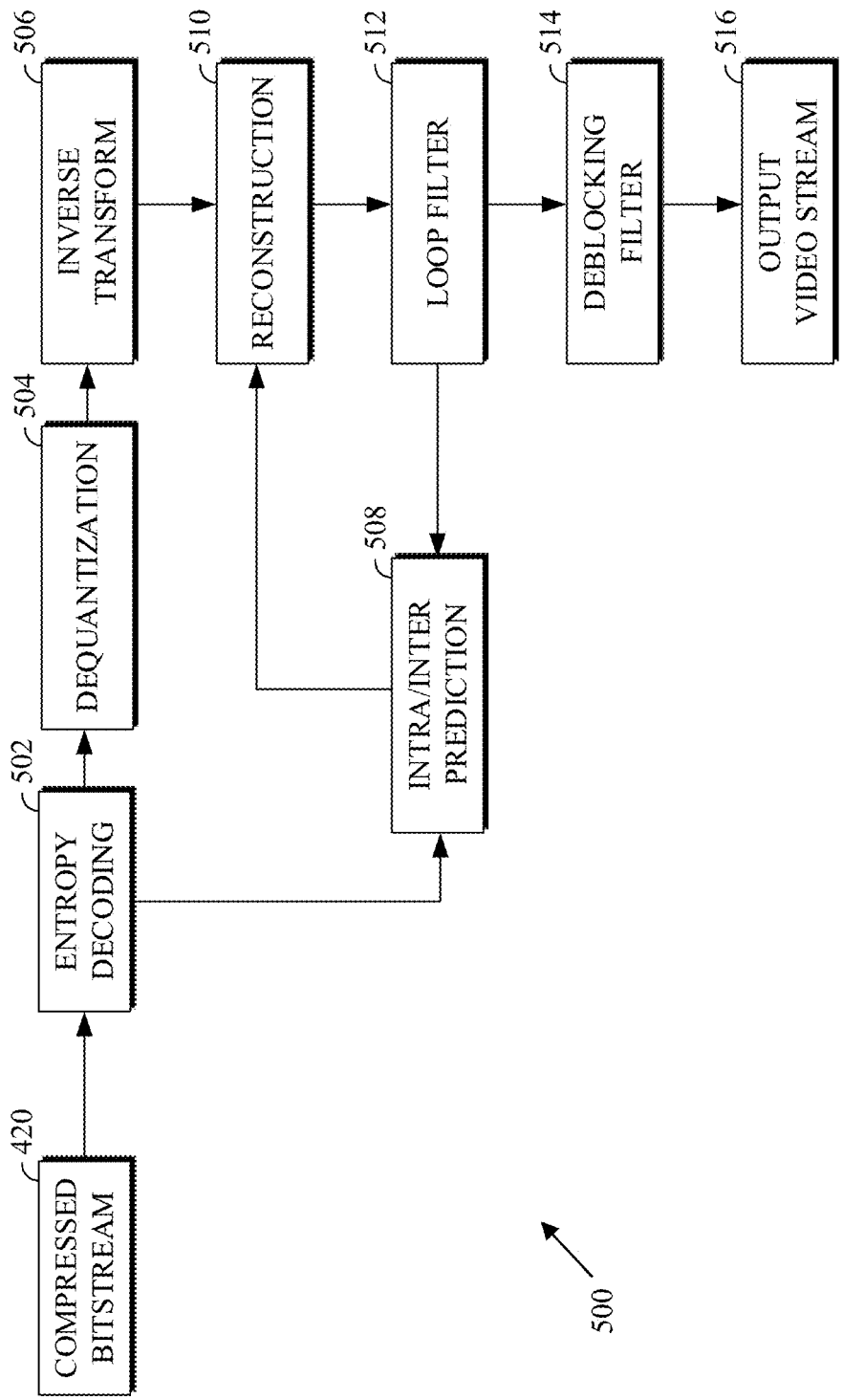
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
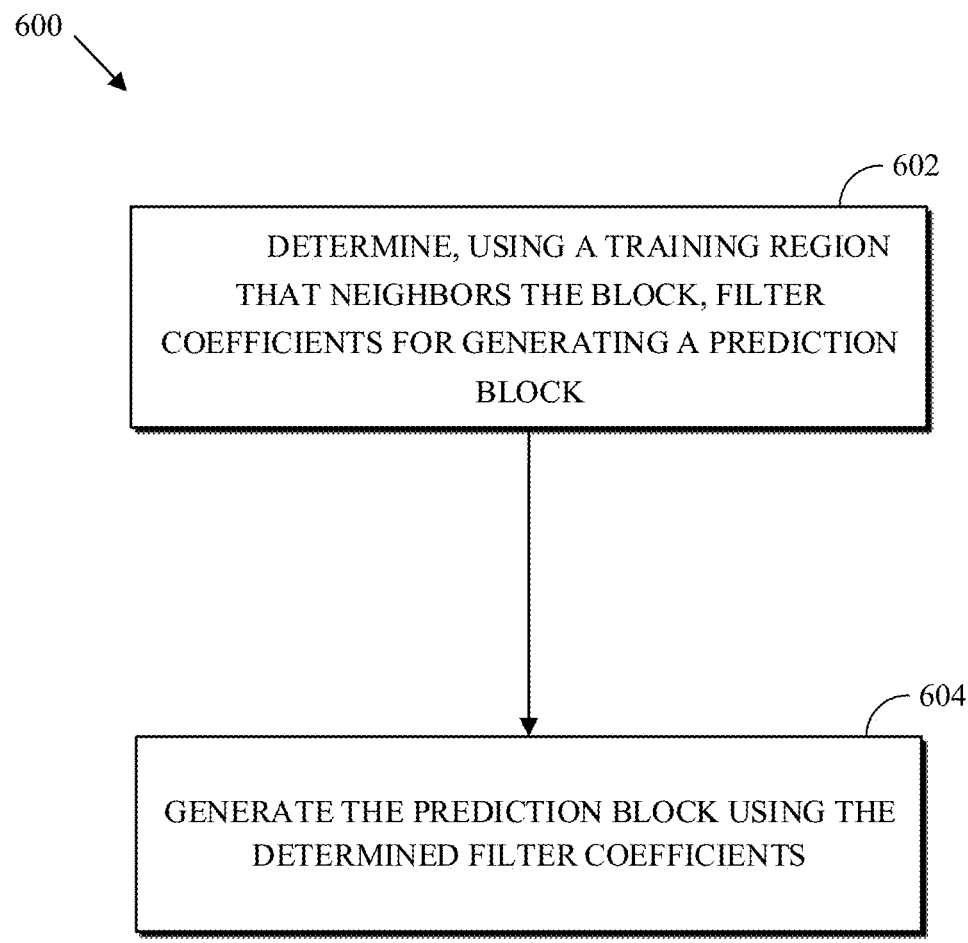
FIG. 6 is a flowchart diagram of a process for generating a prediction block for coding a block of a frame using intra prediction according to an implementation of this disclosure.

FIG. 6 is a flowchart diagram of a process 600 for generating a prediction block for coding a block of a frame using intra prediction according to an implementation of this disclosure. In an example, the frame can be a frame of a video sequence. In an example, the frame can be single image. The block can be a current block that is being coded. More specifically, the process 600 generates a prediction block, for the block, by recursive extrapolation. The block can be a largest coding block. The largest coding block may be referred by different names, such as a macroblock, a superblock, a largest coding unit, or the like. The size of the largest coding block can be 64'64, 128×128, smaller, or larger. The block can be a sub-block of the largest coding block. As such, the block can have a size of 32×32, 16×16, 8×8, or 4×4. The block can be a chroma block. The block can be a luma block. The block can be co-extensive with a transform block. The prediction block can have the same size as the block. That is, if the block is of size N×N, then the prediction block is also of size N×N, where N is a positive integer.

The process 600 can be implemented in an encoder such as the encoder 400 of FIG. 4. The process 600 can be implemented in a decoder such as the decoder 500 of FIG. 5. The process 600 is described below with reference to FIGS. 7 and 8. When used in an encoder, the term "coding" means encoding. As such, the block is coded for the purpose of determining a residual to be encoded in a compressed bitstream. That is, and as described above, a prediction block is generated for the block. The prediction block is used to generate a residual block that is the difference between the block and the prediction block. The residual block is encoded in the compressed bitstream. When used in a decoder, the term "coding" means "decoding." That is, and as described above, a prediction block is generated for the block. To reconstitute the block, the prediction block is added to a residual block that is decoded from a compressed bitstream.

The process 600 can be implemented, for example, as a software program that can be executed by computing devices such as the transmitting station 102 or the receiving station 106. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the intra/inter prediction stage 402 of the encoder 400 of FIG. 4. In other implementations, the process 600 can be performed in whole or in part by the intra/inter prediction stage 508 of the decoder 500 of FIG. 5.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 can be used to replace the predefined coefficients ($c_v$, $c_h$, $c_d$) described above with respect to FIG. 11 with an online training that is based on analyzing already reconstructed pixels in the neighborhood of a block (or a transform block) being predicted. The online training results in determining (e.g., calculating, generating, etc.) coefficients that are used in the recursive extrapolation.

At 602, the process 600 determines, using a training region that neighbors the block, filter coefficients for generating a prediction block for the block. The training region is peripheral to (e.g., outside of) the block. The training region includes a plurality of reconstructed pixels. The process 600 can determine the filter coefficients using the training region as described with respect to FIGS. 7A and 7B. The training region can be or can include one or more training regions. As further described below, the determined filter coefficients minimize a function of differences. Each difference is a respective difference between a pixel in the training region and a prediction of that pixel in the training region.

As described above, intra prediction of a block uses pixels peripheral to the block. The pixels peripheral to the block are reconstructed pixels. In an encoder, the reconstructed pixels can be as described with respect to the reconstruction stage 414 of FIG. 4. In a decoder, the reconstructed pixels can be as described with respect to the reconstruction stage 510 of FIG. 5.

FIG. 7A is a diagram 700 of a training region according to implementations of this disclosure. The diagram 700 includes a block 702. The block 702 can be a block for which the process 600 determines a prediction block. The block 702 is merely an illustration of a location of a current block to be predicted. Alternatively, or equivalently, the block 702 illustrates the prediction block that is to be generated. The block 702 can be any sized block. For example, the block 702 can have a size (i.e., dimensions) of 4×4, 8×8, 16×16, 32×32, 64×64, 128×128, or any other square or rectangular block size. The block 702 can be a block of a current frame.

The training region of the block 702 can be or can include at least one of a top region 704 (i.e., a top training region), a left region 706 (i.e., a left training region), or a combination thereof. The training region is referred to herein as a context. The top region 704 includes reconstructed pixels and is located, in a raster scan order, above the block 702. The left region 706 includes reconstructed pixels and is located, in a raster scan order, to the left of the block 702. The top region 704 and the left region 706 are shown as overlapping regions. A specific demarcation and/or border separating the top region 704 and the left region 706 is not necessary as further becomes obvious below. As further described below, the training region is either the top region 704 (i.e., the pixels of the top region 704), the left region 706 (i.e., the pixels of the left region 704), or both (the pixels of both regions).

The top region 704 can have a height of $w_1$ rows, where $w_1 > 1$. That is, the top region 704 can include $w_1$ (i.e., more than 1) rows of reconstructed pixels. The top region 704 can extend beyond the size of the block 702 by $w_3$ additional columns, where $w_3$ can be an integer that is equal to or greater than 0. The extended $w_3$ additional columns are referred to herein as the extended top region.

The left region 706 can have a width $w_2$, where $w_2 > 1$. That is, the left region 706 can include $w_2$ (i.e., more than 1) columns of reconstructed pixels. The left region 706 can extend beyond the size of the block 702 by $w_4$ additional rows, where $w_4$ can be an integer that is equal to or greater than 0. The extended $w_4$ additional rows are referred to herein as the extended left region.

In an example, each of $w_1$, $w_2$, $w_3$, and $w_4$ can each be equal to 4. However, each of $w_1$, $w_2$, $w_3$, and $w_4$ can have different (equal or unequal) values, as further described below with respect to offline training.

Extended reconstructed pixels (i.e., the reconstructed pixels of the extended left region and/or the extended top region) may be available for some blocks to be encoded. Typically, when encoding an image, and as described above, the image is divided into largest coding blocks (e.g., macroblocks, super blocks, etc.) or into coding blocks of a certain size. A largest coding block can be encoded to determine a rate-distortion cost. The largest coding block can then be reclusively divided again into smaller blocks. For example, a 64×64 block may be divided into four 32×32 blocks; each of the 64×64 blocks can be further divided into 32×32 sub-blocks; and so on. Rate-distortion values can be determined for the sub-blocks. As such, for at least some sub-blocks, the right neighboring reconstructed columns and/or bottom neighboring reconstructed rows may be available for a block (or sub-block) that contains the sub-block.

In an example, the online training can be or can include using (e.g., analyzing) a training region of reconstructed pixels. Three possible training regions (referred to here as "contexts") can be used: a full context, a left context, and a top context.

The full context includes $w_1$ rows above the block 702 and $w_2$ columns to the left of the block 702. The full context can also include $w_3$ additional columns (if available) and $w_4$ additional left rows (if available).

The left context, illustrated in a context 708, includes reconstructed pixels that are to the left of the block 702. More specifically, the left context includes $w_2$ columns to the left of the block 702. The left context can also include $w_1$ additional rows (if available) to the left of the block 702 and $w_4$ additional rows (if available) below the block 702.

The top context, illustrated in a context 710, includes reconstructed pixels that are to above the block 702. More specifically, the top context includes $w_1$ rows above the block 702. The top context can also include $w_2$ additional columns (if available) to the left of the block 702 and $w_3$ additional columns (if available) to the right of the block 702.

In an example, the training region can be the left region 706. In an example, the training region can include the top region 704 and the left region 706. The top region 704 can include N (where N>1) number of reconstructed pixel rows. The left region 706 can include M (where M>1) number of reconstructed pixel columns. In an example, N can be equal to M.

Fitting the optimal filter includes determining optimal coefficients to be used in the extrapolation operation. The optimal filter can be a 2-tap filter, a 3-tap filter, a 4-tap filter, or a 5-tap filter. In an example, fitting the optimal filter can be or can include determining a solution to a least-squares problem such as that given in optimization problem (2):

$$(\alpha, \beta, \gamma) = \left( \arg\min_{(\alpha,\beta,\gamma)} \left( \sum_{x \in R} (x - (\alpha x_l + \beta x_{tl} + \gamma x_t))^2 \right) + \lambda(\alpha^2 + \beta^2 + \gamma^2) \right) \quad (2)$$

A person skilled in the art recognizes that "ar g min" determines (e.g., calculates, finds, etc.) the $(\alpha, \beta, \gamma)$ tuples of all possible $(\alpha, \beta, \gamma)$ tuples at which the function values are minimized. In the optimization problem (2), $x_l$, $x_{tl}$, and $x_t$ denote, respectively, the left, top-left, and top neighboring pixels of the pixel x, as described with respect to FIG. 11. However, as it will become more obvious below, other neighboring pixels are possible. In the optimization problem (2), R denotes the set of pixels for which the optimal filter coefficients $(\alpha, \beta, \gamma)$ are to be determined. That is, the set R includes some of the reconstructed pixels of the training region, as further described below. The coefficients $(\alpha, \beta, \gamma)$ are used instead of predefined coefficients $(c_v, c_h, c_d)$, as described with respect to FIG. 11. As such, the function of differences between each pixel in the training region and the respective prediction of that pixel in the training region is a function of a sum of squares of differences between each pixel in the training region and the respective prediction of that pixel in the training region.

The parameter $\lambda$ denotes a regularization coefficient that favors solutions that are closer to zero all else being equal. Solutions that are closer to zero means that the absolute values of the coefficients are small values. That is, if the sum of square error (e.g., $\Sigma_{x \notin R}(x-(\alpha x_l + \beta x_{tl} + \gamma x_t))^2$) is the same as the regularization term (e.g., $\lambda(\alpha^2 + \beta^2 + \gamma^2)$), then the coefficients with smaller absolute values are favored (e.g., selected). Such regularization can often reduce the risk of over fitting. The parameter $\lambda$ can be a predetermined value and may be selected empirically. Such regularization can be used so that the optimization problem (2) has a single solution; otherwise, with $\lambda=0$ and x=constant (i.e., all the pixel values in the training region are the same), $x \notin R$, for instance, the optimization problem (2) can have an infinite number of solutions.

While, a sum of squares is used in the optimization problem (2), more generally, filter coefficients are generated by minimizing a difference between the first reconstructed pixels (e.g., the pixel value x) and respective (e.g., successive) extrapolations of the second reconstructed pixels (e.g., the pixel values $x_l$, $x_{tl}$, and $x_t$). In an example, the difference can be the sum of absolute differences. Any other suitable error measure (i.e., differences) can be used. For a first pixel in the training region, a prediction of the first pixel can include a sum of each of the filter coefficients applied to a respective second pixel, each second pixel is a pixel in the training region that neighbors the first pixel.

The optimization problem (2) is an example of determining optimal coefficients for a 3-tap filter. However, as already mentioned, the optimal filter can be a 2-tap filter, a 4-tap filter, a 5-tap filter, or other sized filter. As such, in the case of a 2-tap filter, the process 600 determines optimal $(\alpha, \beta)$ coefficients using a formula that is similar to the optimization problem (2); in the case of a 4-tap filter, the process 600 determines optimal $(\alpha, \beta, \gamma, \delta)$ coefficients using a formula that is similar to the optimization problem (2); and so on. For example, and as will be further becomes clearer below, the optimal filter may be a 2-tap filter that uses the left and the top-left neighbors. For example, and as further becomes clearer below, the optimal filter may be a 4-tap filter that uses a bottom-left, the left, the top-left, and the top neighbors.

As mentioned above, the process 600 uses online training that is based on analyzing already reconstructed pixels in the neighborhood of the block for deriving (e.g., calculating, determining, inferring, etc.) coefficients for the recursive extrapolation. The process 600 can be likened to using part of the reconstructed pixels (i.e., first reconstructed pixels) as peripheral pixels as described with respect to, for example, the first pixels 908 and/or the second pixels 910 of FIG. 9; and using another part of the reconstructed pixels (i.e., second reconstructed pixels) as source pixels of an image block. A portion 712 of the top region 704 (i.e., the top training region) is used as an illustration. In the illustration a 3-tap filter is assumed.

Pixels 716-720 are part of the first reconstructed pixels. Pixel 714 is part of the second reconstructed pixels. The pixels 716, 718, 720 are, respectively, the left, the top-left, and the top neighboring pixel of the pixel 714. With respect to the pixel 714, x corresponds to the value of a source pixel, and the sum $(\alpha x_l + \beta x_{tl} + \gamma x_t)$ corresponds to a prediction of x as an extrapolation, using the coefficients $(\alpha, \beta, \gamma)$ of the neighboring value $x_l$, $x_{tl}$, and $x_t$. Similar to the recursive extrapolation described with respect to FIG. 11, recursive extrapolation is carried out for the rest of the pixels in the training region.

As mentioned above, the process 600 can determine coefficients for the optimal filter. As such, in addition to the filter coefficients, the process 600 can determine the optimal coefficients for at least a subset of the possible tap combinations. The process 600 can then select those coefficients and tap combination corresponding to the smallest error.

FIG. 7B is a diagram 750 of possible taps according to implementations of this disclosure. Given a current pixel 752 (i.e., a current pixel location), the process 600 can select combinations of available neighboring pixels in the optimization problem (2). The available neighboring pixels can include the pixels labeled "0"-"4." Namely, the available neighboring pixels can include a bottom left pixel (labeled "0"), a left pixel (labeled "1"), a top-left pixel (labeled "2"), a top pixel (labeled "3"), and a top-right pixel (labeled "4").

Implementations according to this disclosure can select any combination of the available pixels labeled "0"-"4." However, in some implementations, which are further described below, no combination that includes both the pixel labeled "0" and the pixel labeled "4" is used. That is, pixel combinations that include both the bottom-left and the top-right neighbors are not allowed. The restriction may be imposed since using the top-right pixel requires a row-major prediction order whereas using the bottom-left pixel requires a column-major prediction order. Using both the top-right pixel and the bottom-left pixel for recursive extrapolation creates a dependency whereby the extrapolation operation requires at least one pixel that isn't yet encoded (e.g., reconstructed).

FIG. 11 is used in conjunction with FIG. 7B to illustrate the dependency. Predicting the pixel at location "1" of FIG. 11, and using the pixels labeled "0" and "4" of FIG. 7B, would mean that $X_{2,0}$ and $X_{0,2}$ are used, which may both be available. However, predicting the pixel at location "5" of FIG. 11, and using the pixels labeled "0" and "4" of FIG. 7B, requires $X_{3,0}$ and the pixel value at location "2;" and predicting the pixel at location "2" of FIG. 11, and using the pixels labeled "0" and "4" of FIG. 7B, would require the pixel value at location "5" and $X_{0,3}$. As such, predicting the pixel value at location "5" requires the pixel value at location "2" and vice versa, thereby creating the dependency.

In the case that both the bottom-left and the top-right neighbors are not used together, a total of 18 combinations of taps are possible: nine 2-tap filters are possible (namely, using the pixel combinations ("0", "1"), ("0", "2"), ("0", "3"), ("1", "2"), ("1", "3"), ("1", "4"), ("2", "3"), ("2", "4"), and ("3", "4")); seven 3-tap filters are possible (namely, using the pixel combinations ("0", "1", "2"), ("0", "1", "3"), ("1", "2", "3"), ("1", "2", "4"), ("1", "3", "4"), and ("2", "3", "4"); and two 4-tap filters are possible (namely, using the pixel combinations ("0", "1", "2", "3") and ("1", "2", "3", "4")).

As indicated above, there can be three possibilities for the training region; namely, use the top region, use the left region, or use both the left and the top region. As also indicated above, there can be 18 possible filter pixel combinations. As such, in an implementation, there can be a total of 3*18=54 possible combinations of filter type and training region. Such combinations can be referred to as adaptive filter modes. That is, each combination can be an adaptive filter mode. The adaptive filter modes can be numbered, such as from 0 to 53. As such, in an example, determining, using the training region that neighbors the block, the filter coefficients for generating the prediction block for the block can include determining (e.g., selecting, choosing, etc.) an adaptive filter mode that is indicative of at least one of the training region (i.e., top region, left region, or both) or neighboring pixel locations (i.e., which of the combination of the bottom-left, the left, the top-left, the top, and the top-right) that are to be used in the recursive extrapolation.

When implemented by a decoder, determining, using the training region that neighbors the block, filter coefficients for generating a prediction block for the block can include decoding, from a compressed bitstream, the adaptive filter mode. The compressed bitstream can be the compressed bitstream 420 of FIG. 5. For example, the decoder can receive an index of the adaptive filter mode and can use the indicated training region and/or the indicated neighboring pixel locations that are to be used in the recursive extrapolation to calculate the optimal filter coefficients using the optimization problem (2). As described above, depending on the indicated neighboring pixel locations, the decoder can calculate 2, 3, or 4 filter coefficients.

Referring again to FIG. 6, at 604, the process 600 generates the prediction block using the determined filter coefficients. The prediction block is generated using recursive extrapolation. The recursive extrapolation is similar to that described with respect to FIG. 11. However, it is to be understood that, while the recursive extrapolation of FIG. 11 uses a 3-tap filter, the process 600 uses the number of taps as determined at 602. It is also to be understood that, while the recursive extrapolation of FIG. 11 uses the left, top-left, and above neighboring pixels in the recursive extrapolation, the process 600 uses the combination of pixels as determined at 602 and as described with respect to the diagram 750 of FIG. 7B.

When implemented by an encoder, the process 600 can include encoding, in a compressed bitstream, the adaptive filter mode. The compressed bitstream can be the compressed bitstream 420 of FIG. 4. Encoding the adaptive filter mode can include or can mean encoding an indication, such as an index, of the adaptive filter mode. The adaptive filter mode can be entropy encoded using a cumulative distribution function. In an example, the same cumulative distribution function can be used to entropy code the adaptive filter mode regardless of the block size.

As described above, 54 combinations of filter type and training region are possible. Additionally, fixed training region sizes are used (i.e., each of $w_1$ and $w_2$ can each be equal to 4). However, if different sizes of left region and/or the top region is also variable, then the total number of combinations significantly increases. The increased number of combinations can be computationally prohibitive and/or can require significant signaling overhead. For example, to indicate one of the 54 possible combinations, six bits may be required. As such, in some implementations, the number of combinations of filter type, training region, and training region size can be reduced using offline training.

Offline training is used to select (e.g., find, determine, choose, etc.) a set of optimal adaptive filter modes, which are to be used by an encoder and a decoder. That is, the offline training is used to select the subset of the set of all possible adaptive filter modes such that the adaptive filter modes of the subset result in the most gain (MSE gain or RD cost gain, as further described below) over not using the selected adaptive filter modes.

In an implementation, the training region size can be fixed, and the optimal number of filter and training region combinations can be selected (e.g., determined, calculated, etc.). In an example, the seven optimal filter and training region combinations can be selected. As such, only those optimal combinations can be used (e.g., tested) by the process 600.

To determine the optimal filter and training region combinations, an offline training process can consider the minimization problem of optimization problem (3):

$$S_k = \arg\min_{S \in P_k(F)} \left[ \sum_{b \in B} \min\left( MSE_{best\_mode}(b), \min_{f \in S}(MSE_f(b)) \right) \right] \quad (3)$$

In the optimization problem (3), F is the set of all possible 54 filters, which are described above; and B is a sufficiently large training set of blocks of varying sizes. $P_k(F)$ is the set of subsets of size k of F. For example, if it is desirable to find the optimal combination of 5 filters, then k would be set to 5. $S_k$ is the combination of the k optimal filters that results from the optimization problem (3). $MSE_{best\_mode}$ (b) is the mean-square-error that is obtained when the training block b is predicted using the optimal (as selected by an encoder) intra prediction mode. $MSE_f(b)$ is the mean-square error of predicting the block b using the adaptive intra prediction mode f. The optimal intra prediction mode is the one of the available intra prediction modes that would be selected, for encoding the block b, by an intra/inter prediction stage, such as the intra/inter prediction stage 402 of FIG. 4. The available intra prediction modes do not include the adaptive filter modes described herein. $MSE_f(b)$ is the mean-square-error obtained if the block b is encoded using the adaptive filter f.

The solution to the optimization problem (3) is the top k adaptive filters for the purpose of minimizing the average MSE of predicting blocks in the training set B when the best mode is picked for each block as a function of the MSE. The "average MSE" refers to the overall MSE over all the training blocks, as to opposed to minimizing the MSE for each training block.

Figure 8:
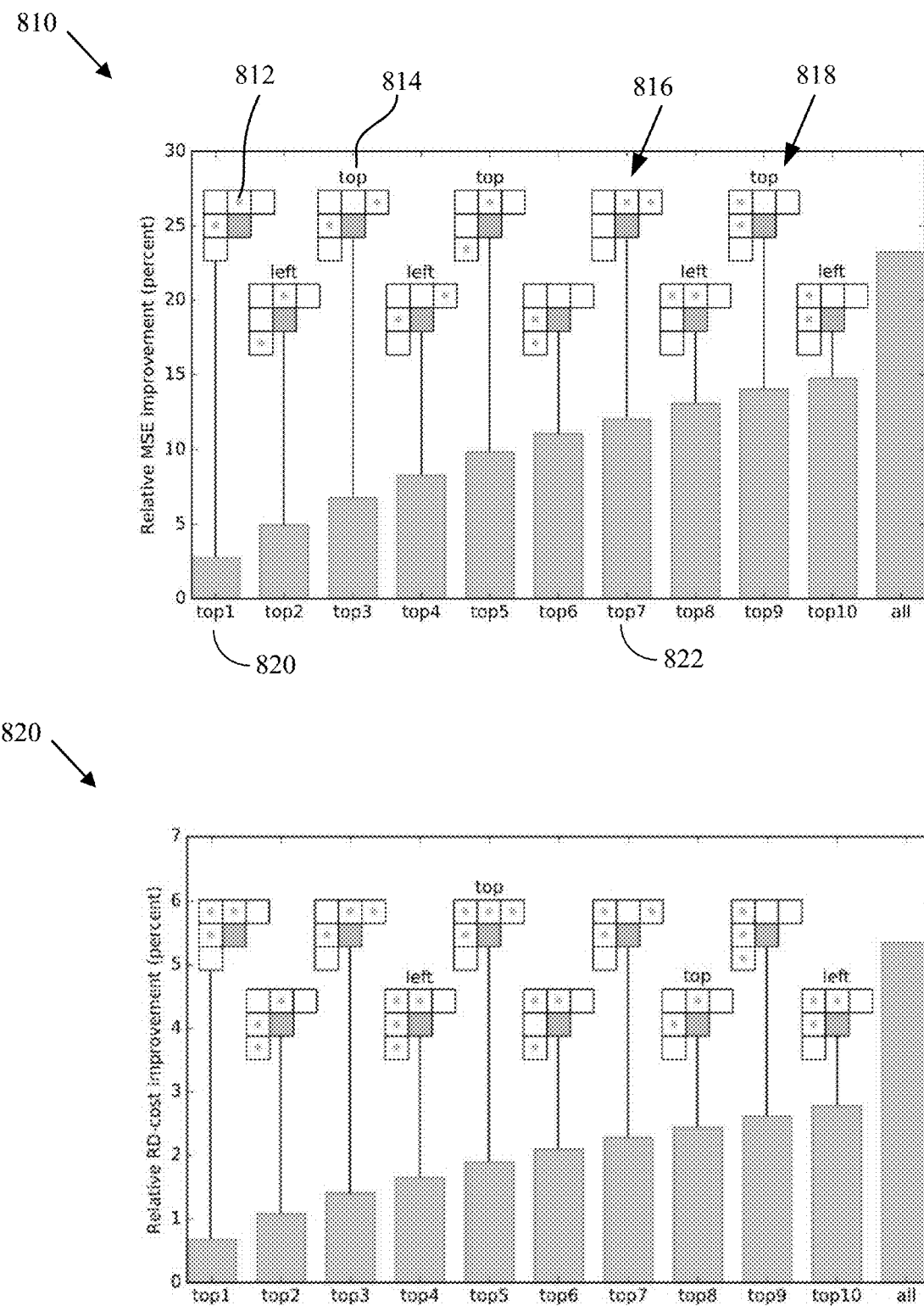
FIG. 8 is a diagram of optimal adaptive filters according to implementations of this disclosure.

FIG. 8 is a diagram of optimal adaptive filters according to implementations of this disclosure. A plot 810 illustrates the optimal adaptive filter configurations for the purpose of minimizing the MSE of a prediction, which is given by the optimization problem (3). It is noted that each of the adaptive filters of the plot 810 has the same shape as that of the diagram 750 of FIG. 7B.

A dot, such as a dot 812, denotes that that tap position is used in the respective adaptive filter combination. A label, such as a label 814 (i.e., "top") on top of a filter configuration indicates the training region (i.e., context) to be used. As such, if the label indicates "top," then the top region (i.e., the top context), is to be used; if the label indicates "left," then the left region (i.e., the left context) is to be used; and if a label is not indicated, then the training region includes both the left region and the top region (i.e., the full context). As such, for example, an adaptive filter 816 is such that the top and the top-right pixels are to be in the extrapolation operations during recursive filtering and that both the top region and the left region (i.e., the full context) are to be used when determining the filter coefficients, such as using (i.e., solving) the optimization problem (1). For example, an adaptive filter 818 is such that the left and the top-left pixels are to be used in the extrapolation operations during recursive filtering and that only the top region (i.e., the top context) is to be used when determining the filter coefficients.

As such, each adaptive intra prediction mode can be characterized by three variables; namely, the number of taps, the locations of the taps, and the training region.

The plot 810 indicates that using only the optimal adaptive filter (i.e., an adaptive filter 820), then an MSE improvement over not using the adaptive filter 820 for intra prediction is approximately 2.5%. Using the top seven adaptive filters (namely, all the filter from the adaptive filter 820 to an adaptive filter 822) can result in a 12% MSE improvement.

Instead of solving an optimization problem that is based on the MSE (such as described with respect to the optimization problem (3)) for determining the optimal adaptive filter configurations, an optimization problem can be based on the rate-distortion (RD) cost of encoding the blocks, b, of the training set B, using the optimal intra prediction mode as compared to encoding the blocks, b, using the adaptive filters. As such, an optimization problem (4) can be used instead of the optimization problem (3):

$$S_k = \arg\min_{S \in P_k(F)} \left[ \sum_{b \in B} \min\left( RD_{best\_mode}(b), \min_{f \in S}(RD_f(b)) \right) \right] \quad (4)$$

In the optimization problem (4), F is the set of all possible 54 filters, which are described above; and B is a sufficiently large training set of blocks of varying sizes. $RD_{best\_mode}$ (b) is the rate-distortion value that is obtained when the training block b is predicted using the optimal (as selected by an encoder) intra prediction mode. $RD_f(b)$ is the rate-distortion value when the block b is predicted using the adaptive intra prediction mode f. The optimal intra prediction mode is the one of the available intra prediction modes that would be selected, for encoding the block b, by an intra/inter prediction stage, such as the intra/inter prediction stage 402 of FIG. 4. The available intra prediction modes do not include the adaptive filter modes described herein.

Whether the optimization problem (3) or the optimization problem (4) is used, the optimal adaptive filters can be selected. Each of optimal adaptive filters can be used as an intra prediction mode (e.g., an adaptive intra prediction mode). In an example, five, seven, fewer, or more optimal adaptive filters can be selected to be used as intra prediction modes.

In the above description, the training regions 704-710 of FIG. 7A are described as having fixed sizes. However, in some implementations, optimal sizes of the training regions can be determined for each of the select optimal adaptive filters. For example, if as described above, seven (7) optimal adaptive filters are selected, then an optimization problem (5) can be solved to determine, for each the optimal adaptive filters the optimal size of a respective training regions; namely, a top region size, a left region size, a right region size, and a bottom region size.

$$(w^1, \ldots, w^7) = \arg\min_{(w^1,\ldots,w^7)} \left[ \sum_{b \in B} \min\left( RD_{best\_mode}(b), \min_{i \in [1,7]} (RD_{adapt}^i(w^i, b)) \right) \right] \quad (5)$$

In the optimization problem (5), $(w^1, \ldots, w^7)$ describe the training regions sizes for each of the seven optimal adaptive filters selected; B denotes the training set of blocks (e.g., transform units or prediction units) of one fixed size; $RD_{adapt}^i(w^i b)$ is the rate-distortion cost of using the $i^{th}$ adaptive filter intra mode with $w^i$ as the training region parameters for a current block b.

As the brute force approach of trying every possible combination of $(w^1, \ldots, w^7)$ may be prohibitively computationally expensive, a greedy approximation minimization algorithm can be used, in some implementations. For example, starting with some reasonable initial approximation, a mode can be iteratively picked where the mode provides the best improvement. Such approximation may be selected empirically. For example, simple initial settings (such as $w_1 = w_2 = w_3 = w_4 = 4$) can be tested and the best one of the simple initial settings can be selected as the initial setting. The training region shape parameter of the mode can then be modified while keeping all the other modes fixed. To further narrow down the search space, only the training region shape modifications in a small neighborhood around the current approximation of the training region shape for a given mode can be considered. This iterative process can then be repeated until optimization problem converges to a solution.

In an implementation, Table I lists the seven adaptive intra prediction modes that are used by an encoder, such as the encoder 400 of FIG. 4, and a decoder, such as the decoder 500 of FIG. 5. The column "Num" of Table I provides an index that is used for easy reference to an adaptive intra prediction mode; the column "Filter Size" indicated the number of taps of the adaptive intra prediction mode, the column "Neighboring Pixels" refers to the neighboring pixels (as described with respect to FIG. 7B) that are used in the recursive extrapolation; and the column "Training Context" refers to the context (as described with respect to FIG. 7A) that is used for deriving the coefficient values of the adaptive intra prediction mode (as described with respect to the optimization problem (2)).

TABLE I

| Num | Filter Size | Neighboring Pixels | Training Context |
|---|---|---|---|
| 0 | 3-tap | 1, 2, 3 | Full context |
| 1 | 3-tap | 0, 1, 3 | Full context |
| 2 | 3-tap | 1, 3, 4 | Full context |
| 3 | 4-tap | 0, 1, 2, 3 | Left context |
| 4 | 4-tap | 1, 2, 3, 4 | Top context |
| 5 | 3-tap | 0, 2, 3 | Full Context |
| 6 | 3-tap | 1, 2, 4 | Full Context |

The below arrays adapt_filter_intra_thickness_ver, adapt_filter_intra_thickness_hor, adapt_filter_intra_top_right_offset, and adapt_filter_intra_bottom_left_offset correspond respectively, to $w_1$, $w_2$, $w_3$, and $w_4$, which are described above with respect to FIG. 7A. That is, the arrays define the parameters that describe the size of the training region used to fit the adaptive filter for each transform size and adaptive filter intra mode.

The arrays adapt_filter_intra_thickness_ver, adapt_filter_intra_thickness_hor, adapt_filter_intra_top_right_offset, and adapt_filter_intra_bottom_left_offset describe, by transform block size, the respective $w_1$, $w_2$, $w_3$, and $w_4$ sizes for each of the adaptive intra prediction modes of Table I.

```
adapt_filter_intra_thickness_ver[TX_SIZES_ALL][ADAPT_FILTER_INTRA_MODES] = {
    { 4, 6, 2, 4, 5, 6, 6 },        // TX_4X4
    { 3, 5, 6, 5, 8, 8, 9 },        // TX_8X8
    { 11, 10, 12, 10, 6, 8, 9 },    // TX_16X16
    { 13, 16, 13, 14, 13, 16, 13 }, // TX_32X32
    { 33, 33, 33, 33, 33, 33, 33 }, // TX_64X64
    { 5, 9, 3, 3, 9, 8, 8 },        // TX_4X8
    { 3, 7, 2, 5, 5, 7, 6 },        // TX_8X4
    { 11, 5, 11, 8, 7, 8, 8 },      // TX_8X16
    { 9, 5, 9, 7, 5, 8, 3 },        // TX_16X8
    { 14, 15, 20, 19, 14, 14, 13 }, // TX_16X32
    { 5, 7, 8, 9, 5, 12, 11 },      // TX_32X16
    { 33, 33, 33, 33, 33, 33, 33 }, // TX_32X64
    { 17, 17, 17, 17, 17, 17, 17 }, // TX_64X32
    { 7, 11, 9, 10, 11, 6, 6 },     // TX_4X16
    { 2, 7, 5, 1, 4, 6, 7 },        // TX_16X4
    { 13, 13, 19, 15, 13, 15, 17 }, // TX_8X32
    { 5, 4, 6, 6, 3, 9, 9 },        // TX_32X8
    { 33, 33, 33, 33, 33, 33, 33 }, // TX_16X64
    { 9, 9, 9, 9, 9, 9, 9 }         // TX_64X16
};
adapt_filter_intra_thickness_hor[TX_SIZES_ALL][ADAPT_FILTER_INTRA_MODES] = {
    { 2, 2, 5, 5, 6, 7, 6 },        // TX_4X4
    { 9, 5, 6, 6, 2, 7, 8 },        // TX_8X8
    { 12, 9, 9, 6, 10, 7, 6 },      // TX_16X16
    { 16, 14, 13, 15, 19, 17, 16 }, // TX_32X32
    { 33, 33, 33, 33, 33, 33, 33 }, // TX_64X64
```

```
                    { 3, 6, 6, 5, 1, 2, 6 },             // TX_4X8
                    { 3, 4, 9, 9, 2, 5, 7 },             // TX_8X4
                    { 9, 5, 6, 7, 4, 7, 7 },             // TX_8X16
                    { 6, 9, 5, 11, 10, 10, 9 },          // TX_16X8
                    { 12, 9, 6, 5, 11, 11, 7 },          // TX_16X32
                    { 19, 14, 19, 15, 14, 13, 13 },      // TX_32X16
                    { 17, 17, 17, 17, 17, 17, 17 },      // TX_32X64
                    { 33, 33, 33, 33, 33, 33, 33 },      // TX_64X32
                    { 2, 3, 6, 5, 4, 5, 7 },             // TX_4X16
                    { 11, 13, 6, 9, 11, 9, 6 },          // TX_16X4
                    { 9, 9, 5, 3, 8, 5, 4 },             // TX_8X32
                    { 16, 20, 13, 18, 16, 13, 20 },      // TX_32X8
                    { 9, 9, 9, 9, 9, 9, 9               // TX_16X64
                    { 33, 33, 33, 33, 33, 33, 33 }       // TX_64X16
            };
    adapt_filter_intra_top_right_offset
            [TX_SIZES_ALL][ADAPT_FILTER_INTRA_MODES] = {
                    { 1, 4, 3, 2, 1, -4, 0 },            // TX_4X4
                    { 2, 1, 7, -1, 1, 1, 3 },            // TX_8X8
                    { -2, -1, 8, -3, 5, 2, 5 },          // TX_16X16
                    { -2, -3, 17, -3, 14, 2, 14 },       // TX_32X32
                    { 0, 0, 33, 0, 33, 0, 33 },          // TX_64X64
                    { -3, 1, 4, 2, 1, 3, 6 },            // TX_4X8
                    { 0, 1, 6, 2, 5, -3, 3 },            // TX_8X4
                    { -1, 0, 8, -4, 3, 2, 5 },           // TX_8X16
                    { 0, 0, 8, -3, 7, 0, 11 },           // TX_16X8
                    { 0, -2, 10, -2, 6, -4, 7 },         // TX_16X32
                    { -1, -4, 20, -3, 16, -3, 15 },      // TX_32X16
                    { 0, 0, 17, 0, 17, 0, 17 },          // TX_32X64
                    { 0, 0, 33, 0, 33, 0, 33 },          // TX_64X32
                    { 4, -1, 2, -2, 1, -3, 2 },          // TX_4X16
                    { 2, 3, 11, 3, 7, -3, 8 },           // TX_16X4
                    { -1, -4, 5, -2, 2, -4, 7 },         // TX_8X32
                    { -2, 2, 15, -4, 19, -1, 17 },       // TX_32X8
                    { 0, 0, 9, 0, 9, 0, 9 },             // TX_16X64
                    { 0, 0, 33, 0, 33, 0, 33 }           // TX_64X16
            };
    adapt_filter_intra_bottom_left_offset
            [TX_SIZES_ALL][ADAPT_FILTER_INTRA_MODES] = {
                    { -1, 3, 0, 2, 3, 5, -3 },           // TX_4X4
                    { 1, 7, 1, 1, 2, 7, -2 },            // TX_8X8
                    { -1, 6, -3, 8, -1, 10, -1 },        // TX_16X16
                    { -1, 13, -4, 15, -2, 15, -3 },      // TX_32X32
                    { 0, 33, 0, 33, 0, 33, 0 },          // TX_64X64
                    { -3, 8, -1, 4, 1, 7, 0 },           // TX_4X8
                    { 0, 4, 2, 1, 0, 3, 0 },             // TX_8X4
                    { -4, 10, -2, 7, -1, 9, 0 },         // TX_8X16
                    { -1, 5, -3, 4, 2, 7, 4 },           // TX_16X8
                    { -4, 16, 1, 13, -3, 15, -1 },       // TX_16X32
                    { -3, 8, 1, 7, -1, 9, -1 },          // TX_32X16
                    { 0, 33, 0, 33, 0, 33, 0 },          // TX_32X64
                    { 0, 17, 0, 17, 0, 17, 0 },          // TX_64X32
                    { -1, 11, 0, 9, 1, 8, -2 },          // TX_4X16
                    { 2, 4, 1, 1, 2, 0, -3 },            // TX_16X4
                    { -1, 18, -3, 13, 1, 14, 1 },        // TX_8X32
                    { -2, 5, 0, 4, -2, 5, -1 },          // TX_32X8
                    { 0, 33, 0, 33, 0, 33, 0 },          // TX_16X64
                    { 0, 9, 0, 9, 0, 9, 0 }              // TX_64X16
            };
```

The line "{12, 9, 9, 6, 10, 7, 6}, //TX_16X16" of the adapt_filter_intra_thickness_hor is now used to illustrate how the above arrays should be understood: For a transform block of size 16×16, the value of $w_2$ for each of the adaptive intra prediction modes 0-7 of Table I is, respectively, 12, 9, 9, 6, 10, 7, and 6.

Another aspect of the disclosed implementations is a process for generating a prediction block for decoding a block of a frame using intra prediction that includes decoding, from a compressed bitstream, an adaptive intra prediction mode, the adaptive intra-prediction mode being indicative of a training region of reconstructed pixels to be used in extrapolation operations; determining, using the training region, filter coefficients for generating a prediction block; and generating, by recursive extrapolations that use the filter coefficients, the prediction block for the block. The prediction block can be added to a decoded residual block to reconstitute the block.

As described above, the adaptive intra-prediction mode can be one of a plurality of adaptive intra-prediction modes, $S_k$, that are selected, using an offline training, from a set F of possible adaptive intra-prediction modes by solving an optimization problem. In an example, the optimization can be the optimization problem (3). In another example, the optimization problem can be the optimization problem (4). In another example, the optimization problem can include the optimization problem (3) and the optimization problem (5). In another example, the optimization problem can include the optimization problem (4) and the optimization problem (5).

Table II presents comparison results in terms of BD-rate (with negative values indicating coding performance gain). Table II compares the gains obtained, as compared to a baseline where adaptive intra prediction modes are not used, when the top seven optimal adaptive filters with optimal training region sizes are used, the top five optimal adaptive filters with optimal training region sizes are used, the top three optimal adaptive filters with optimal training region sizes are used, and the top seven optimal adaptive filters with fixed training region sizes are used.

TABLE II

Different variations of the adaptive intra prediction filters over a baseline.

| Modification | Midres (keyframe only) | Hdres (keyframe only) | Midres (30 frames, speed = 1) | Hdres (30 frames, speed = 1) |
|---|---|---|---|---|
| Using top 7 modes | −1.094% (ssim: −1.138%) | −1.207% (ssim: −1.269%) | −0.360% (ssim: −0.451%) | −0.228% (ssim: −0.236%) |
| Using top 5 modes | −0.954% | −1.125% | — | — |
| Using top 3 modes | −0.721% | −0.845% | — | — |
| 7 modes with constant training region ($\omega 1 = \omega 2 = \omega 3 = \omega 4 = 4$) | −0.790% | −1.029% | — | — |

Table III compares the gains from the conventional filter intra modes with proposed adaptive ones over a baseline. The row labeled FILTER_INTRA illustrates the gains obtained when the mode filter_mode (i.e., using predefined coefficients) is used over not using the filter_intra mode. The row labeled ADAPT_FILTER_INTRA illustrates the gains obtained when the adaptive intra prediction modes, which are described herein are used over not using the adaptive intra prediction modes modes. The row labeled FILTER_INTRA+ADAPT_FILTER_INTRA illustrates the gains obtained when both the filter_intro mode and the adaptive intra prediction modes are used.

TABLE III

| Modification | Midres (keyframes only) | Hdres (keyframes only) |
|---|---|---|
| FILTER_INTRA | −0.630% | −0.635% |
| ADAPT_FILTER_INTRA | −1.589% | −1.668% |
| FILTER_INTRA + ADAPT_FILTER_INTRA | −1.720% | −1.833% |

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for decoding a block of a frame using intra prediction, the apparatus comprising:
a processor that:
decodes, from a compressed bitstream, an adaptive intra-prediction mode of a set of adaptive filter modes, the adaptive intra-prediction mode indicating a number of filter coefficients and relative locations with respect to a to-be-predicted pixel of a sub-set of neighboring pixels of the to-be-predicted pixel,
wherein the set of adaptive filter modes includes a first adaptive mode and a second adaptive mode,
wherein the first adaptive mode and the second adaptive mode indicate a same number of coefficients, and
wherein the first adaptive mode indicates a first set of first relative locations of a first sub-set of neighboring pixels that is different from a second set of second relative locations of a second sub-set of neighboring pixels indicated by the second adaptive mode;
determines filter coefficients for generating a prediction block of the block; and
generates, by recursive extrapolations that use the filter coefficients and the relative locations, the prediction block of the block.

2. The apparatus of claim 1, wherein the relative locations of the to-be-predicted pixel comprise a bottom-left, a left, a top-left, a top, and a top-right neighboring pixels of the to-be-predicted pixel.

3. The apparatus of claim 1, wherein the number of filter coefficients is one of 2, 3, or 4.

4. The apparatus of claim 1, wherein to determine the filter coefficients for generating the prediction block comprises to:
use a training region adjacent to the block for determining the filter coefficients, wherein the training region to the block comprises reconstructed pixels.

5. The apparatus of claim 4,
wherein the training region comprises an adjacent line and neighboring lines,
wherein the adjacent line comprises at least one a top row of top reconstructed pixels peripheral to a top edge of the block or a left column of left reconstructed pixels peripheral to a left edge of the block, and
wherein the training region further comprises at least two reconstructed lines.

6. The apparatus of claim 5, wherein to use the training region adjacent to the block for determining the filter coefficients comprises to:
obtain the filter coefficients by fitting an optimal filter to a difference between pixels of the adjacent line and respective predictions of the pixels of the adjacent line, wherein the respective predictions of the pixels of the adjacent line are obtained using respective relative locations of the pixels of the adjacent line.

7. The apparatus of claim 6, wherein fitting the optimal filter includes a regularization factor.

8. The apparatus of claim 4, wherein the adaptive intra-prediction mode indicates a size of the training region.

9. The apparatus of claim 8, wherein the size of the training region comprises at least one of a first height of a top region peripheral to a top edge of the block, a first width of a right region peripheral to a right edge of the block, a second height of a bottom region peripheral to a bottom edge of the block, or a second width of a left region peripheral to a left edge of the block.

10. The apparatus of claim 4, wherein the training region comprises at least one of four rows of pixels adjacent a top edge of the block, four columns of pixels adjacent a right edge of the block, four rows of pixels adjacent a bottom edge of the block, or four columns of pixels adjacent a left edge of the block.

11. A method for decoding a block of a frame using intra prediction, comprising:
decoding, from a compressed bitstream, an adaptive intra-prediction mode of a set of adaptive filter modes, the adaptive intra-prediction mode indicating a number of filter taps,
wherein the set of adaptive filter modes includes a first adaptive mode and a second adaptive mode, and
wherein the first adaptive mode and the second adaptive mode indicate a same number of taps;
determining filter coefficients for generating a prediction block; and
generating, by recursive extrapolations that use the filter coefficients, the prediction block of the block.

12. The method of claim 11,
wherein the adaptive intra-prediction mode further indicates relative locations with respect to a to-be-predicted pixel of a sub-set of neighboring pixels of the to-be-predicted pixel
wherein the first adaptive mode indicates a first set of first relative locations of a first sub-set of neighboring pixels that is different from a second set of second relative locations of a second sub-set of neighboring pixels indicated by the second adaptive mode.

13. The method of claim 12, wherein the relative locations of the to-be-predicted pixel comprise a bottom-left, a left, a top-left, a top, and a top-right neighboring pixels of the to-be-predicted pixel.

14. The method of claim 13, wherein the set of adaptive filter modes comprises at least two of 3-tap filters that use the following subsets of the relative locations: (left, top-left, top), (bottom-left, left, top), (left, top, top-right), (bottom-left, top-left, top), or (left, top-left, top-right).

15. The method of claim 14, wherein determining the filter coefficients for generating the prediction block comprises:
determining the filter coefficients using a training region comprising includes reconstructed rows above the block 702 and reconstructed columns left of the block.

16. The method of claim 13, wherein the set of adaptive filter modes comprises two 4-tap filters that use the following subsets of the relative locations: (bottom-left, left, top-left, top) and (left, top-left, top, top-right).

17. The method of claim 16, wherein determining the filter coefficients for generating the prediction block comprises:
determining the filter coefficients of the 4-tap filter that uses the relative locations (bottom-left, left, top-left, top) using a training region comprising reconstructed pixels that are left of the block.

18. The method of claim 16, wherein determining the filter coefficients for generating the prediction block comprises:

determining the filter coefficients of the 4-tap filter that uses the relative locations (left, top-left, top, top-right) using a training region comprising reconstructed pixels that are above the block.

19. A non-transitory computer-readable storage medium, comprising executable instructions that, when executed by a processor, facilitate performance of operations for decoding a block of a frame using intra prediction, the operations comprising operations to:

decode, from a compressed bitstream, an adaptive intra-prediction mode of a set of adaptive filter modes, the adaptive intra-prediction mode indicating a number of filter taps,
wherein the set of adaptive filter modes includes a first adaptive mode and a second adaptive mode, and
wherein the first adaptive mode and the second adaptive mode indicate a same number of taps;
determine filter coefficients for generating a prediction block of the block; and
generate, by recursive extrapolations that use the filter coefficients, the prediction block of the block.

20. The non-transitory computer-readable storage medium of claim 19,
wherein the adaptive intra-prediction mode further indicates relative locations with respect to a to-be-predicted pixel of a sub-set of neighboring pixels of the to-be-predicted pixel
wherein the first adaptive mode indicates a first set of first relative locations of a first sub-set of neighboring pixels that is different from a second set of second relative locations of a second sub-set of neighboring pixels indicated by the second adaptive mode.

\* \* \* \* \*